US006020805A

United States Patent [19]

Børja

[11] Patent Number: 6,020,805

[45] Date of Patent: Feb. 1, 2000

[54] PERMANENT MAGNET ASSEMBLY

[75] Inventor: Bjørn Børja, Moss, Norway

[73] Assignee: Seas Fabrikker As, Norway

[21] Appl. No.: 09/201,863

[22] Filed: Dec. 1, 1998

[30] Foreign Application Priority Data

Apr. 12, 1997 [NO] Norway .................................... 975614

[51] Int. Cl.[7] .............................. H01F 27/30; H01F 7/00; B01D 35/06

[52] U.S. Cl. ...................... 336/84 M; 335/231; 335/306; 210/222

[58] Field of Search .................................... 335/231, 306, 335/222; 310/13–15, 23; 210/222; 123/536; 381/199–201; 336/84 M

[56] References Cited

U.S. PATENT DOCUMENTS

| | | | |
|---|---|---|---|
| 3,478,289 | 11/1969 | Parnell | 335/231 |
| 3,979,566 | 9/1976 | Willy | 179/115.5 ES |
| 4,679,022 | 7/1987 | Miyamoto et al. | 335/296 |
| 4,829,277 | 5/1989 | Stahura et al. | 335/306 |
| 5,434,458 | 7/1995 | Stuart et al. | 310/13 |
| 5,661,446 | 8/1997 | Anderson et al. | 335/229 |
| 5,786,741 | 7/1998 | Leibzon | 335/222 |

*Primary Examiner*—M. C. Geller
*Assistant Examiner*—Anh Mai
*Attorney, Agent, or Firm*—Banner & Witcoff, Ltd.

[57] ABSTRACT

A permanent magnet assembly comprising an essentially tubular magnet element which is radially magnetized, inner and outer members of a magnetic material resting against inner and outer sides, respectively, of the magnet element, and an annular top plate placed on one end of the outer member. The annular top plate and an end portion of the inner member form an annular air gap which is axially separated from the magnet element and across which the magnetic flux of the magnet element extends radially. The inner member has a polygonal outer surface. The magnet element is divided axially into a number of separate magnet segments having inner surfaces fixed to corresponding outer surfaces of the inner member. Also, the outer member is divided axially into a number of yokes corresponding to and fixed to the outer surfaces of respective magnet segments and to the adjacent underside of the top plate, so that the cavity present between the air gap and the top plate and the adjacent ends of the magnet segments communicates with outwardly open ventilating passages defined by mutually adjacent pairs of magnet segments and yokes. In this manner, the cavity is effectively ventilated towards the surroundings.

6 Claims, 3 Drawing Sheets

PERMANENT MAGNET ASSEMBLY

The invention relates to a permanent magnet assembly comprising an essentially tubular magnet element which is radially magnetized, inner and outer members of a magnetic material resting against the inner and outer sides, respectively, of the magnet element, and an annular top plate placed on one end of the outer member and together with an end portion of the inner member forming an annular air gap which is axially separated from the magnet element and across which the magnetic flux of the magnet element extends radially, the inner member having a polygonal outer surface and the magnet element being divided axially into a number of separate magnet segments having inner surfaces fixed to corresponding outer surfaces of the inner member.

Magnet systems of the type to which the invention relates, are especially intended for electrodynamic linear motors having a movable coil, for example for loudspeakers. Such magnet systems have been designed in different ways, for example as shown in FIGS. 1–4 of the drawings. The purpose in all cases is to obtain a homogeneous, radially directed magnetic flux distribution in an annular air gap, so that a current-carrying coil which is placed coaxially in the air gap, will be influenced by an axial force.

FIG. 1 shows a magnet system which is based on an axially magnetized, annular magnet 1, usually of ferrite material. An inner tube 2 together with annular disk members 3, 4 on each side of the magnet 1 conduct the magnetic flux to an annular air gap 5. This design has found a very wide use because the magnet material is cheap, and because of the fact that assembly and magnetization are simple to accomplish. From drawbacks there must be mentioned that the magnetic leakage flux 6 is strong. This entails a poor utilization of the magnet and for instance can result in that the picture on the viewing screen of PC and TV equipment is degraded with such a magnet system in the vicinity. Further, the cross-sectional area of the magnet system (transversely to the axis of symmetry) is relatively large, something which may involve an undesired reflection of sound energy in cone loudspeakers, or large physical dimensions for loudspeakers having a dome-shaped diaphragm.

FIG. 2 shows a system which is based on an axially magnetized, coin or disk-shaped magnet 7, usually of NdFeB material. The design entails a very good utilization of the magnet. However, since the area of the magnet is limited by the coil diameter, it is also limited how large magnetic flux can be obtained. A possible axial hole centrally through the assembly to obtain ventilation, would additionally reduce the magnetic flux. The system has a moderate depth and cross-sectional area in relation to the coil diameter, something which is very advantageous in some applications.

FIG. 3 shows a system which is based on a radially magnetized, tubular magnet 8, and which is known from U.S. Pat. No. 5,434,458. Also here the utilization of the magnet is good and the cross-sectional area is small. An apparent drawback is that the magnet area is equal to the area of the air gap. This results in that the flux density in the air gap 9 becomes low, and that the design is only used with relatively large air gap areas. The practical use of such systems is very limited.

FIG. 4 shows a system which in principle is of the type stated in the introduction. Such a system is known from U.S. Pat. No. 3,979,566. The system is based on a radially magnetized tubular magnet 10 which, together with tubular inner and outer members 11, 12 and an annular top plate 13, form a magnetic circuit conducting the magnetic flux radially across the air gap 14. Since the area of the magnet may be much larger than the air gap area, the drawback of the system according to FIG. 3 is eliminated. However, the magnet is more poorly utilized, since a magnetic leakage flux 15 arises at the end of the magnet facing away from the air gap. No practical utilization of said patent is known, not even after that magnets having a high energy density have been brought on the market. As possible reasons for this it may be mentioned that a radially magnetized, tubular magnet is expensive in purchase and complicated to assemble between a pair of soft magnetic tubes.

From U.S. Pat. No. 3,478,289 there is known a magnet system which is based on the same basic principle as the system according to FIG. 4, but wherein the tubular magnet 10 is replaced by four rectangular, adjacent magnet blocks. The inner member 11 of the system consists of a pole piece which is solid and underneath has an extension having a square cross-section. The outer member 12 is replaced by four rectangular, adjacent yoke plates. The top plate 13 has a corresponding square shape. Between the top plate and the magnets there is formed a cavity which is ventilated via four channels extending along the corner edges where the yoke plates abut two by two. These channels are markedly long and narrow and is the source of resonance phenomena which may result in reduced sound quality from a corresponding loudspeaker.

The object of the invention is to provide an improved magnet system of the type having a radially magnetized magnet, but wherein the system is based on cheap magnets and component in other respects, and wherein said interior cavity between the top plate and the magnets is ventilated towards the surroundings in an efficient manner and without any negative side effects.

The above-mentioned objects are achieved with a magnet assembly of the introductorily stated type which, according to the invention, is characterized in that also the outer member is divided axially into a number of mutually separated yokes corresponding to and fixed to the outer surfaces of respective magnet segments and to the adjacent underside of the top plate, so that the cavity present between the air gap and the top plate and the adjacent ends of the magnet segments communicates with outwardly open ventilating passages defined by mutually adjacent pairs of magnet segments and yokes.

The use of discrete magnets and yokes entails that the cavity present between the air gap and the adjacent end of the magnets is efficiently ventilated or vented, whereas said cavity in the known systems is closed or ventilated in an inadequate manner. The air stiffness and the cavity resonances etc. entailed by such cavities, thereby are avoided. The components of the system according to the invention can be assembled in a simple manner by means of known methods, e.g. glueing.

The magnet system may seem to be complicated and expensive, but applied in loudspeakers wherein the demands on precision in the reproduction are high, the advantages in the form of resonance freedom and minimal reflections together with a high magnetic output can stand in an acceptable relation to the price.

The invention will be further described below in connection with exemplary embodiments with reference to the drawings, wherein FIGS. 1–4 show examples of prior art magnet systems described above;

Figure 1:
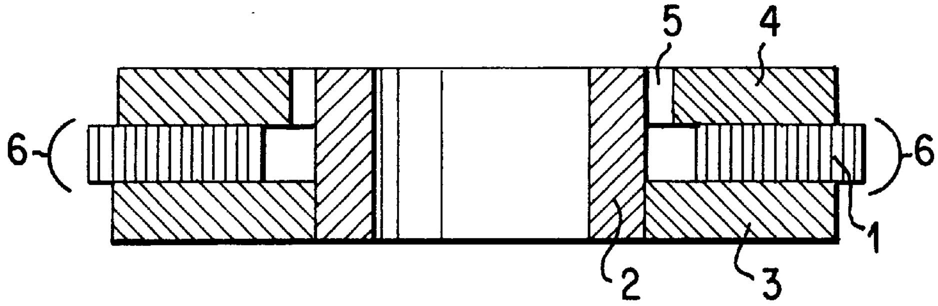
FIG. 1 PRIOR ART
Figure 2:
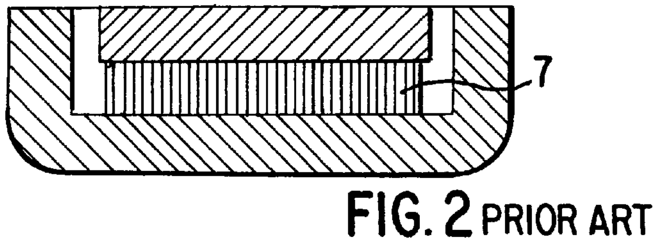
FIG. 2 PRIOR ART
Figure 3:
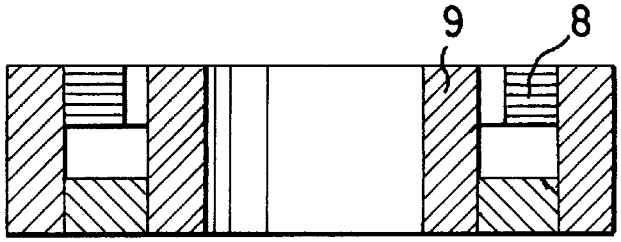
FIG. 3 PRIOR ART
Figure 4:
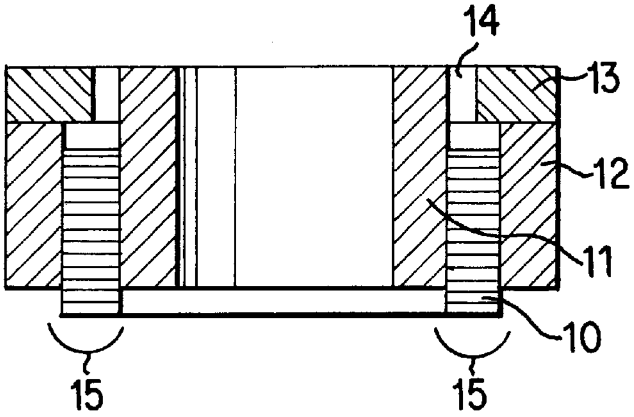
FIG. 4 PRIOR ART
Figure 5:
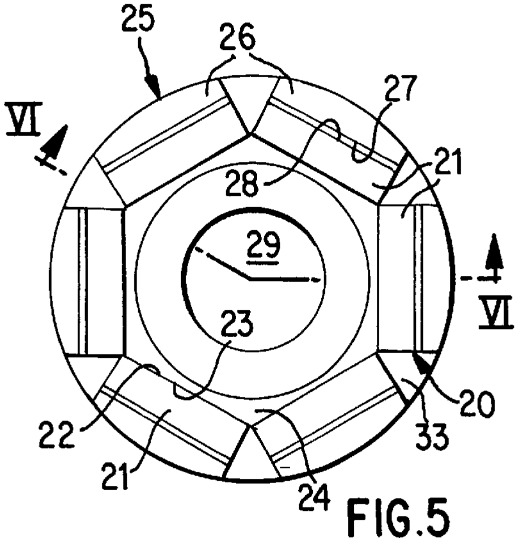
FIG. 5 shows a plan view, viewed from the underside, of an embodiment of a magnet assembly according to the invention.

With the prior art as represented by the system according to FIG. 4 as a starting point, the magnet assembly according to the invention may also be said to comprise an essentially tubular magnet element which is radially magnetized. However, as appears from FIGS. 5–8, the magnet element, which in its entirety is designated 20, in the present assembly is divided axially into a number of separate magnet segments 21 having inner surfaces 22 which are fixed to corresponding outer surfaces 23 of an inner member 24 forming part of the magnetic circuit of the assembly. In analogy with the known systems, the assembly may also be said to comprise an outer, essentially tubular member forming part of the magnetic circuit of the assembly. This outer member in its entirety is designated 25 in FIG. 5. However, in the assembly according to the invention also the outer member is divided axially into a number of separate parts, more specifically into a number of yokes 26 which, with their inner surfaces 27, are fastened to the outer surfaces 28 of respective magnet segments 21.

Figure 6:
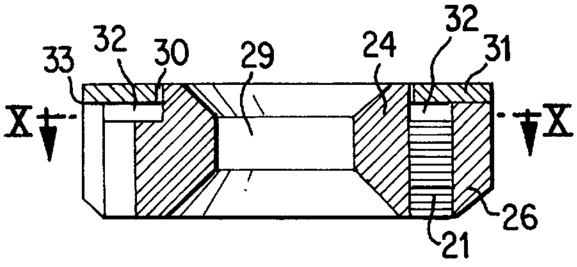
FIG. 6 shows an axial sectional view along the line VI—VI in FIG. 5.
Figure 7:
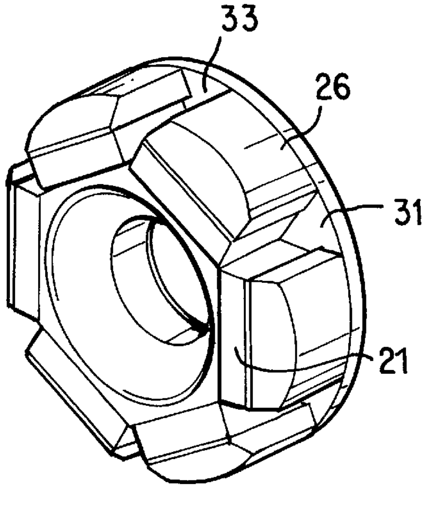
FIGS. 7 and 8 show perspective views of the embodiment according to FIGS. 5 and 6, as viewed obliquely from below and obliquely from above, respectively.
Figure 8:
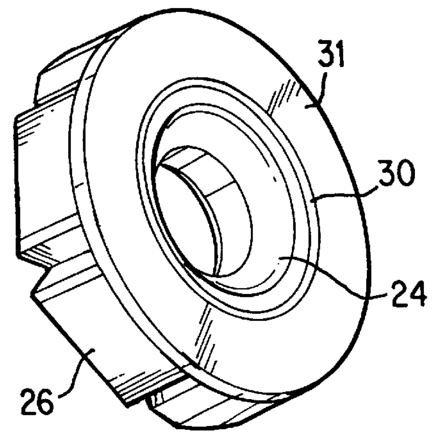
Figure 9:
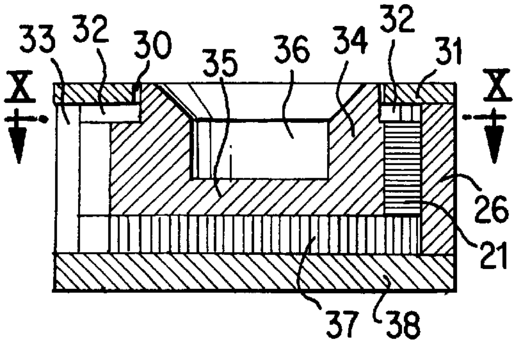
FIG. 9 shows an axial sectional view corresponding to that of FIG. 6 of a modified embodiment of a magnet assembly according to the invention.
Figure 11:
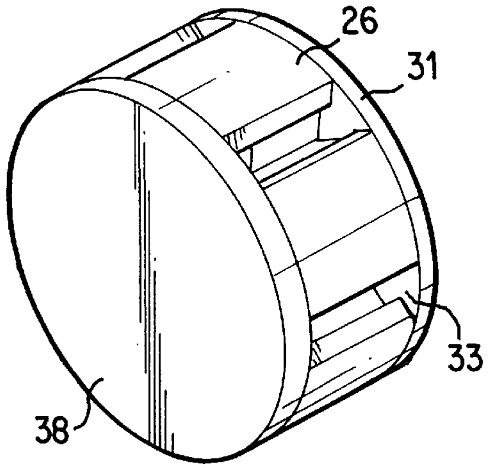
FIGS. 11 and 12 show perspective views of the embodiment in FIG. 9, as viewed obliquely from below and obliquely from above, respectively.
Figure 10:
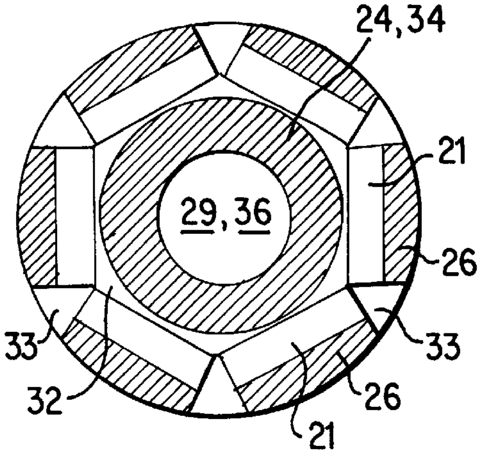
FIG. 10 shows a cross-sectional view along the line X—X in FIG. 6 and FIG. 9, respectively.
Figure 12:
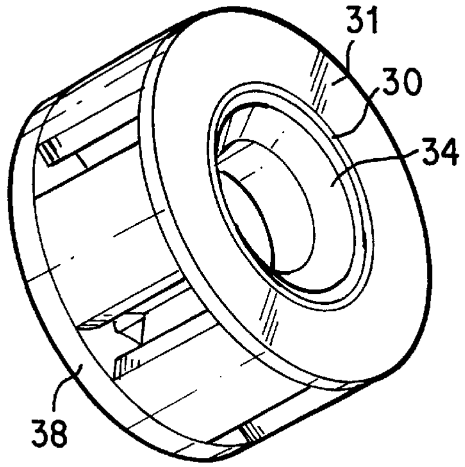

In the illustrated embodiment the inner member 24 is an annular member having a cross-section in the form of a regular polygon having a central hole 29 of which the axial shape appears from FIG. 6. As appears from FIGS. 6 and 8, the upper end of the inner member 24 has a circularly cylindrical outer surface defining the inner surface of the annular air gap 30 of the system, whereas the outer surface of the air gap is defined by the inner surface of the hole in an annular top plate 31 having an underside which rests against and is fixed to the surfaces of adjacent upper ends of the yokes 26.

As will be appreciated, the magnetic flux is directed approximately radially through the magnet segments 21, axially through the inner member 24, radially through the air gap 30 and the top plate 31, and axially through the yokes 26 back to the magnet segments 21.

The magnet segments 21, which in the illustrated embodiment are planar blocks having a rectangular cross-section, may be manufactured from all available permanent-magnetic materials, but the invention shows to better advantage with high energy magnets, e.g. from NdFeB. The inner member 24, the yokes 26 and the top plate 31 are manufactured from a material having adequate soft-magnetic properties, e.g. iron. The individual components of the system can be jointed by means of known techniques, e.g. glueing.

As mentioned above, the use of separate magnets and yokes entails that the cavity 32 which is present between the air gap 30 and the top plate 31 and the adjacent ends of the magnet segments 21, will be efficiently ventilated or vented, the cavity being in direct communication with outwardly open ventilation passages 33 which are defined by mutually adjacent pairs of magnet segments 21 and yokes 26. As mentioned, this is advantageous in that one avoids air stiffness and cavity resonances etc. entailed by such closed cavities.

In the illustrated embodiment the polygonal inner member 24 is hexagonal, so that the system comprises six magnets and six yokes. The invention is, however, not restricted to this number. The number of magnets (and sides in the polygon) must be chosen as a compromise between production price and lost flux from the magnet to the interior leakage field of the system.

It has been found that the leakage field does not result in any significant disturbances of TV/PC-displays. If one still wants to reduce the leakage fields, this can be done as in the embodiment according to FIGS. 9–12. In this embodiment the inner member 34 of the system is formed as a cup having a bottom 35, so that the hole 36 in the member is not through-going. An axially magnetized, additional magnet element 37 having the same shape as the bottom 35 is fixed between the bottom and a yoke plate 38 which in turn is magnetically connected to the yokes 26. The air gap flux here will increase because of both increased magnet area and re-directed leakage flux.

The drawback of the fact that the inner member is closed, in some applications will be acceptable considered in relation to the advantages.

In the embodiment described above the magnet segments 21 are formed as planar blocks, and the yokes 26 have corresponding planar surfaces, but curved outer surfaces forming together a circular contour. In an alternative embodiment the magnets and yokes may be formed as curved plates (not shown), the number of magnets and yokes then being able to be reduced, for example from six to three. Even if each magnet and each yoke becomes more expensive, the advantages of fewer parts, simplified assembly and a lower price of the inner member may result in that such a design will be attractive.

I claim:

1. A permanent magnet assembly comprising an essentially tubular magnet element which is radially magnetized, inner and outer members of a magnetic material resting against inner and outer sides, respectively, of the magnet element, and an annular top plate placed on one end of the outer member and together with an end portion of the inner member forming an annular air gap which is axially separated from the magnet element and across which the magnetic flux of the magnet element extends radially, the inner member having a polygonal outer surface and the magnet element being divided axially into a plurality of separate magnet segments having inner surfaces fixed to corresponding outer surfaces of the inner member, the outer member being divided axially into a plurality of mutually separated yokes each corresponding to and fixed to an outer surface of a respective one of the magnet segments and to an adjacent underside of the top plate so that a cavity present between the air gap and the top plate and the adjacent ends of the magnet segments communicates with radially outwardly open ventilating passages defined by mutually adjacent pairs of magnet segments and yokes.

2. A magnet assembly according to claim 1, characterized in that the inner member is an annular member having a cross-section in the form of a regular polygon having a central, at least partly through-going hole, and that the magnet segments are blocks having a rectangular cross-section.

3. A magnet assembly according to claim 2, characterized in that it includes six magnet blocks.

4. A magnet assembly according to claim 2, characterized in that the magnet segments and the yokes are formed from curved plates.

5. A magnet assembly according to claim 3, characterized in that the magnet segments and the yokes are formed from curved plates.

6. A magnet assembly according to any one of the preceding claims, characterized in that the inner member is cup-shaped and has a bottom, and that an axially magnetized, additional magnet element of the same shape as the bottom is fixed between the bottom and a yoke plate which is magnetically connected to the yokes constituting the outer member.

* * * * *